United States Patent Office 3,323,912

Patented June 6, 1967

3,323,912

INDIUM-BISMUTH-GOLD ALLOYS

Frank J. Bolda, Poughkeepsie, John T. Gulliksen, Peekskill, Alfred E. Oldaker, Poughkeepsie, and Rupert F. Ross, Fishkill, N.Y., assignors to International Business Machines Corporation, Armonk, N.Y., a corporation of New York No Drawing. Filed Dec. 2, 1964, Ser. No. 415,465
2 Claims. (Cl. 75—134)

This invention relates to alloys and more particularly it relates to low melting point ternary alloys composed of indium, bismuth and gold.

Solders commonly utilized in making connections in electrical systems have relatively high melting points and, therefore, require the application of relatively large amounts of heat in their utilization. While such high temperature solders are generally adequate for use in ordinary systems, they cannot be used in conjunction with heat sensitive systems. The large amounts of heat required to utilize the prior art solders is of such a high degree that it may damage or destroy elements in a heat sensitive system.

Heat sensitivity of elements has become an increasingly significant consideration with the increased miniaturization and microminiaturization of electronic components and systems. Many of the elements comprising the miniature components and systems are inherently heat sensitive. Other materials, which are not normally heat sensitive, are so small or thin when used in miniature systems, that exposing them to excessive heat, such as would be required in the utilization of high temperature solders, would cause irreparable damage.

Damage caused by the excessive heat required to utilize high temperature solders may be avoided by the utilization of suitable low-temperature solders.

Solders suitable for utilization in electrical and electronic systems, and especially in miniature systems, should be ductile so that they may be formed into small threads or wires and various shapes for optimum utility. Additionally, such solders should be corrosion resistant for permanence and dependability, and of low electrical (ohmic) resistance to minimize IR drop and to avoid affecting the electrical characteristics of the components.

It is, therefore, a primary object of this invention to provide an improved low melting point alloy for use as a solder in an environment or system, or on a component which is heat sensitive or which would be damaged by the use or presence of excessive soldering heat.

Other objects of this invention include providing improved alloys which are ductile, nonbrittle, corrosion resistant, and of low electrical (ohmic) resistance for use in various electrical and electronic systems.

The foregoing and other objects and advantages of the invention will be apparent from the following more particular description of compositions and of methods of utilizing said compositions.

In accordance with the present invention, alloys are provided comprising 69–71% indium, 27–29% bismuth, and 1.5–2.5% gold and having melting points of approximately 155° F.–175° F.

The alloys of the present invention may be prepared by placing appropriate weight percentages of the various metals in a nonreactive vessel such as a standard solder pot, Pyrex glass beaker, stainless steel container, or other nonreactive nonalloying container. In the preferred method of preparation, appropriate amounts of indium and bismuth are first placed in the container and melted. Due to the relatively high melting point of gold, the composition is initially raised to a high temperature, on the order of about 500° F. in order to cause the gold to melt or dissolve into the mixture at a reasonable speed. In view of the high temperature utilized in placing the gold into solution, a small amount of flux is preferably added to the indium-bismuth mixture in order to avoid oxidation of these metals at the increased temperatures.

Utilizing the alloys of the present invention, components have been successfully joined at temperatures as low as 160° F.–165° F. Preferred methods of soldering components utilizing the alloys of the present invention are hereinafter described.

One or both of the metals to be joined may be first tinned with 60% Sn–40% Pb solder by hot dip process or by plating. The timing deposit may be on the order of 0.0001 in. to 0.002 in. thickness or more, according to the extent of alloying desired. The surfaces of the components to be joined are then cleaned. A low temperature flux may be applied to both surfaces after cleaning to prevent oxidation and to aid in heat transfer. The thus prepared surfaces and an alloy of the present invention are then placed together, preferably under pressure, and heated to 160° F.–165° F. The heating is preferably done in a temperature controlled oven; however, it may be done with equal facility utilizing a controlled soldering iron, a blast of hot air, or any other desired method of heating.

Other uses of the alloys of the present invention include the repair of heat sensitive systems. In certain types of microcircuits a conducting pattern is etched and plated upon a thermoplastic resin to form a component. Occasionally the thin strips of plated material are incomplete or broken. Heat sensitive components of this type have been repaired utilizing the alloys of the present invention. Due to the size of the components, the repair work is done under a microscope, preferably by the steps of brush plating Sn-Pb upon the ends of the broken strip lines, adding a little flux, placing a small thread of an alloy of the present invention to link the separated portions, and then heating. This method of repair, utilizing the alloys of the present invention, makes possible the reclamation of otherwise useless components while avoiding damage to that heat sensitive thermoplastic base material.

In certain types of miniaturized circuits, gold foil is utilized as a ground connection. Such gold foil grounds may be on the order of 0.001–0.005 in. thick. It has been found that the low temperature alloys of the present invention make excellent connections for such grounds to the miniature circuit.

While the alloys of the present invention have initially low melting points, which they are valued for, after they are utilized to make connections as previously described, the melting points of the connections are found to be higher than the melting points of the original solders. These higher reflow temperatures are apparently due to the alloying action of the solder with the materials to which it is connected. These high reflow temperatures are advantageous in that a system inadvertently subjected to extreme heat is less likely to come apart.

A preferred alloy composition of the present invention consists of 70% indium, 28% bismuth, and 2% gold. The melting point of this alloy is 158° F. This alloy material has been tested and examined to determine various physical characteristics. It has been found to have a tensile strength of 3280 p.s.i., and shear strength of 1690 p.s.i. The specific gravity of the alloy is 7.9. The microstructure of the alloy was noted to contain a cubic crystal structure. It is believed that the other alloys of the present invention have substantially similar characteristics.

The elongation capability of the alloys of the present invention is on the order of 70%, which is evidence of their excellent ductility. This fine ductility is surprising in view of the fact that bismuth and its alloys are normally quite brittle.

The electrical resistance of the various alloys is low, on the order of 30 micro ohms, while the electrical resistivity is on the order of 28.3 micro ohms. cm. After artificial aging of soldered connections in a temperature-humidity chamber (98% rel. hum.), no measurable change in the resistance of the soldered connections was found.

Additional testing of soldered connections was made under conditions of high temperature and humidity for periods of 20–30 days. No signs of corrosion were found upon the alloy. Connections which were soldered and tested under these conditions were found to have no corrosion at the soldered joints and all connections remained intact and appeared to be the same as when initially made. It would appear that the small gold content of the alloy greatly enhances its corrosion resistance.

Other uses of the present alloys, other than those described, are possible and will be evident to one skilled in the metallurgical art. For example, it has been found that the alloys can be formed into a "pencil" having a diameter of the order of 0.020 in. and used, much as a pencil, to make electrical connections between elements by "writing" between them. This is apparently due to the high pressure exerted upon the small surface, whereby sufficient frictional heat is generated to melt the alloys or soften them to the point where they are easily rubbed off. The alloys can also serve as heat transfer media. These and other uses are encompassed within the present invention.

While the invention has been particularly described with reference to preferred examples thereof, it will be understood by those skilled in the art that the foregoing and other changes in composition and details may be made without departing from the spirit and scope of the invention.

What is claimed is:

1. Low melting point alloys composed of 69–71% by weight of indium, 27–29% by weight of bismuth, and 1.5–2.5% by weight of gold.

2. A low melting point alloy composed of 70% by weight of indium, 28% by weight of bismuth, and 2% by weight of gold.

References Cited

UNITED STATES PATENTS

| | | | |
|---|---|---|---|
| 2,649,368 | 8/1953 | Smith et al. | 75—134 |
| 2,649,369 | 8/1953 | Smith et al. | 75—134 |
| 2,680,071 | 6/1954 | Epstein et al. | 75—134 |
| 2,767,085 | 10/1956 | Burnside | 75—134 |

DAVID L. RECK, *Primary Examiner.*

R. O. DEAN, *Assistant Examiner.*